Sept. 28, 1943.  S. T. SIKES, JR  2,330,752
RATE-OF-PENETRATION INDICATOR
Filed Nov. 24, 1941
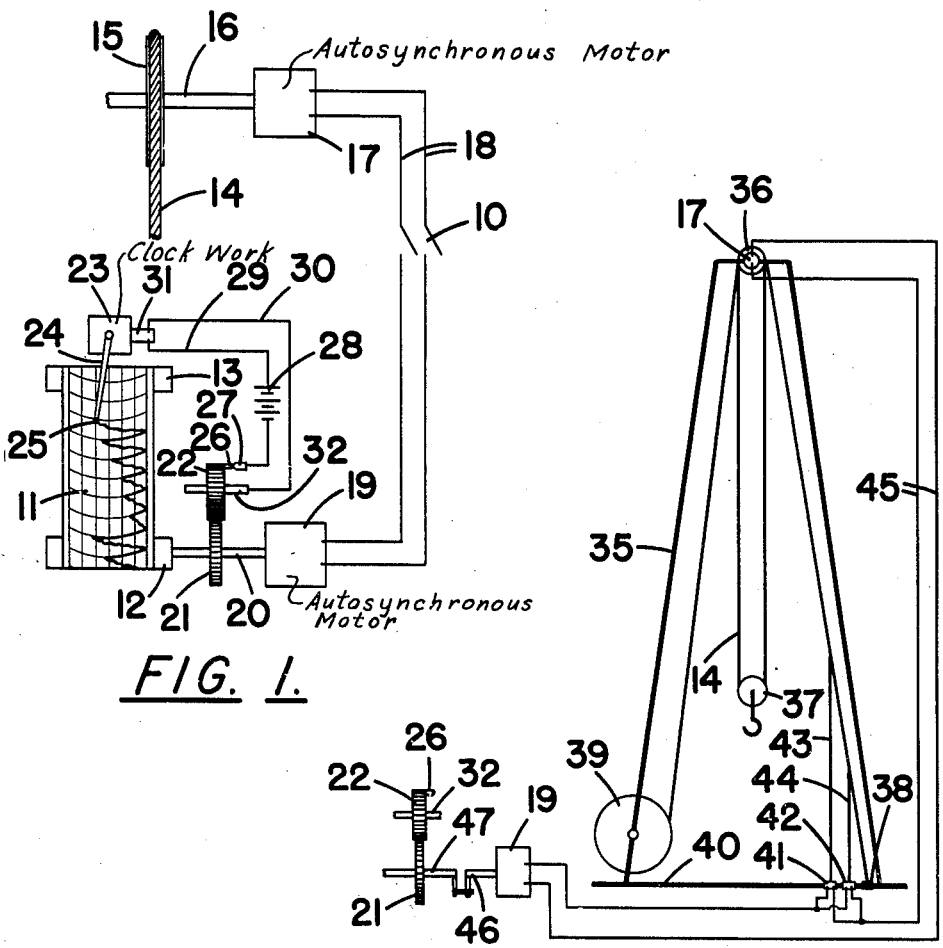
FIG. 1.
FIG. 2.
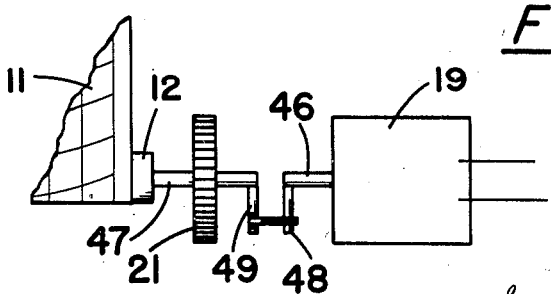
FIG. 3.
Samuel T. Sikes jr. INVENTOR.
BY J. D. McKean
ATTORNEY Patented Sept. 28, 1943

2,330,752

UNITED STATES PATENT OFFICE 2,330,752

RATE-OF-PENETRATION INDICATOR

Samuel T. Sikes, Jr., Houston, Tex., assignor to Standard Oil Development Company, a corporation of Delaware Application November 24, 1941, Serial No. 420,279

4 Claims. (Cl. 234—36.5)

The present invention is directed to a device for recording the rate of penetration of a drill bit.

In the drilling of bore holes, such as is required in the production of petroleum, it is often desirable to record how rapidly the drill penetrates the different formations encountered. Such records are useful for a number of purposes. For example, if a thick stratum unusually difficult to drill is encountered, such a record serves to indicate the performance characteristics of the drill bits and equipment used. On the other hand, in ordinary drilling, the speed of penetration will indicate the relative ease with which the various strata are penetrated and will allow the structure over a field to be correlated by the comparison of the rate-of-penetration logs of various bore holes drilled throughout the field.

It is accordingly an object of the present invention to devise a means for indicating and recording the rate of penetration of a drill bit used for producing bore holes.

Other objects and advantages of the present invention may be seen from a reading of the following description taken in conjunction with the drawing in which Fig. 1 is a diagrammatic illustration showing one embodiment of the present invention;

Fig. 2 is a view showing another embodiment of the present invention applied to a drilling rig; and Fig. 3 is a fragmentary view showing a portion of the device of Fig. 2 in greater detail.

Referring specifically to the drawing, a strip chart 11 having its ends wound on drums 12 and 13 is caused to move proportionally to the movement of one of the lines 14 supporting the traveling block (not shown in this figure), by a conventional rotary drilling rig. A sheave 15 is arranged adjacent drilling line 14 so that its rotary movement will be proportional to the linear movement of line 14.

Sheave 15 is supported by shaft 16 which is secured thereto for rotation therewith, and attached to one end of shaft 16 is an autosynchronous motor 17 electrically connected through cable 18 to autosynchronous motor 19. A shaft 20 connects motor 19 with drum 12 so that the amount of movement of strip chart 11 will be proportional to the movement of cable 14.

As is known to the skilled workman in the drilling art, as each new joint is added to the drill stem and moves downwardly in the bore hole, the cable carrying the traveling block moves a distance proportional to the length of drill pipe.

It will accordingly be evident that in accordance with the mechanism above described the linear movement of a strip chart 11 will be in proportion to the downward movement of the drill bit. Accordingly, the strip chart may be calibrated to reflect the total depth of the bore hole.

Shaft 20 carries gear 21 which mates with pinion 22 carried by shaft 32. Gear 21 and pinion 22 are of such a ratio that the pinion makes one complete revolution for each unit of hole drilled. It is convenient to proportion these ratios so that the pinion makes one complete revolution for each foot of hole made. Pinion 22 is preferably constructed of a non-conducting material, such as fiber, and carries a projecting contact member 26 having electrical connection with shaft 32. Contact 26 wipes against a corresponding contact 27 with every revolution of pinion 22 and the two members in effect form a single point distributor. The circuit containing this distributor comprises a source of direct current, such as a battery 28, connected through conductor 29 to solenoid 31 which is electrically connected through conductor 30 to shaft 32, thereby forming a complete circuit when contact 26 wipes against contact 27.

Stopclock 23 is provided with hand 24 carrying pen 25. This pen is arranged to produce a record upon strip chart 11. Clock 23 is of the type wherein a single movement of a plunger returns the hand to its initial point, and its movement is immediately resumed. Solenoid 31 is arranged to operate such a plunger, thereby setting the clock back to its initial point every time contacts 25 and 26 complete the electrical circuit through the solenoid. As such clocks are old to the art, the specific operating mechanism is not shown on the drawing.

It is preferred to proportion the clock and the length of the clock hands so that hand 24 will be moved across one of the divisions of chart 11 with each minute of time elapsed after the hand begins to move from its initial position. With the clock proportioned for such movement and pinion 22 arranged to make one complete revolution for each foot of hole drilled, the record produced on the chart indicates directly the time required to drill each foot of hole. The curve will comprise a series of peaks, each peak representing one foot of hole drilled and the magnitude of the peak indicating the time required to produce this foot of bore hole.

In the embodiment above described the reversal of movement of the drilling line as in pulling up the Kelly joint to add another joint of pipe, spudding, or coming out of the bore hole, will cause the direction of rotation of motors 17 and 19 to be reversed, in turn, reversing the direction of drum 12. Such reversal of movement would be undesirable and it would cause an undesirable retracting of the chart.

In order to prevent such an occurrence, switch 10 is arranged in the electrical conductors connecting motors 17 and 19 and any time that it may be necessary to raise the bit from the bottom of the hole, switch 10 is manually operated to disconnect the two motors and make the chart drive inoperable, thereby preventing such a reversal of movement of the chart.

It may be desirable to arrange a rate of penetration meter, as above described, with switches which will automatically prevent the moving of the strip chart when spudding the pipe, making a connection or making a round trip. Such an arrangement is illustrated in Fig. 2.

Referring to Fig. 2, within derrick 35 provided with crown block 36 is suspended traveling block 37 by cable 14. Dead end 38 of the drilling line is attached to the substructure of the derrick, as conventional to the art, and the other end of the cable is controlled by hoist 39. Attached to the floor 40 of the derrick are microswitches 41 and 42. The construction of microswitches is well known, being described, for example, in U. S. Patent 1,960,020, and the detailed construction of these elements is not shown in applicant's drawing as they form no part of the present invention except in combination with the other elements.

Switches 41 and 42 are mechanically connected through cables 43 and 44 to the drilling line at a point relatively close to the dead end thereof. In this modification, motors 17 and 19 are electrically connected through conductors 45 in which the microswitches 41 and 42 are arranged in parallel. The microswitches are so arranged that switch 41 opens when drilling line is supporting less than the combined weight of the traveling block, swivel, hook, elevators and Kelly plus the approximate weight of a single joint of drill pipe and closes when this and greater loads are carried. Microswitch 42 is arranged so that it will close when the drilling line is supporting only the weight of the traveling block, hook and elevators, and opens when this load is exceeded.

In this modification, shafts 46 and 47 connect drum 12 with motor 19. As shown in the detail drawing of Fig. 3, shaft 46 is provided with an arm 48 extending at right angles thereto, and shaft 47 is provided with an arm 49 which first extends at right angles thereto and then makes an angle of 90° so that it will cooperate with arm 48 when the shaft rotates in one direction, but will back away from 48 when the direction of rotation of the shaft is reversed. The device is so proportioned that when arm 49 is in contact with arm 48, the total vertical travel of the traveling block between the floor and the crown block of the derrick will not cause arm 49 to back up a complete revolution and come in contact with the other side of arm 48. The purpose of arms 48 and 49 is to permit reversed motion of the driving arm 48 while spudding or carrying out other drilling operations requiring raising the drill pipe without causing the strip chart to back up, but will cause the chart to move in the proper direction when the bit is again on bottom and drilling is resumed.

The purpose of the microswitch 41 is to make the unit automatic while making connections, that is, while adding single joints of drill pipe. In performing this operation, the pipe must be raised an amount equivalent to the length of the Kelly joint, and the string of drill pipe set on the slips. During this operation, the arm 48 backs away from arm 49. The Kelly joint is then disconnected from the string of drill pipe, and this causes the microswitch 41 to open the circuit between the self-synchronising elements 17 and 19, thereby allowing motor 19 to remain stationary while the Kelly is picked up, a single joint of pipe attached to the drill stem, either by a rathole connection, or by setting the Kelly in the rathole and picking up the single and adding it directly to the string. When the Kelly is again connected to the whole string of drill pipe, microswitch 41 is closed, causing motor 19 to become operative, whereby the lowering of the string of drill pipe an amount equal to the length of the Kelly to place the bit on the bottom will rotate arm 48 forward and bring it in contact with arm 49 preparatory to again moving the recording chart. It will be apparent that in the drilling rig a portion of the Kelly is above the rotary table equivalent in length to the single joint of pipe added to the string, with the device ready to record the drilling rate as the hole is made and the Kelly is lowered.

By placing the second microswitch 42 in parallel with microswitch 41, a means is provided which allows arm 48 to oscillate without causing movement of the arm 49 and chart 11 while making round trips.

In coming out of the hole, as the Kelly is pulled up, arm 48 is backed away from arm 49. The Kelly is disconnected from the string of drill pipe, causing the microswitch 41 to open and making motor 19 inoperative. The Kelly is set in the rathole and next a complete stand of pipe is pulled from the hole. The weight of the entire string is sufficient to close the microswitch 41, causing motor 19 to become operative and arm 48 to back further away from arm 49. The stand is then unscrewed from the string of pipe and set to one side, and the elevators disconnected. Disconnecting the elevators closes microswitch 42, and as the elevators are lowered to pick up the next stand of pipe, motor 19 is operative and moves until the elevators are in position for putting the next stand which returns arm 48 to the same approximate position it was in before the first stand of pipe was raised. The above described procedure is repeated in withdrawing the remaining stands until all of the drill pipe has been removed from the bore hole.

It will be evident in going back into the hole that the procedure above described will be reversed accordingly; when all the drill pipe is again connected, the Kelly in place and the drill bit at the bottom of the hole, arm 48 will be in contact with arm 49 and motors 17 and 19 electrically connected so that the device will again begin recording the rate of penetration when drilling is resumed.

While I have disclosed preferred embodiments of the present invention, it will be apparent to the skilled worker that various changes in size, shape and proportion of the various parts may be made without departing from the scope of the invention, and it is accordingly my intention to embrace such changes in the hereto appended claims.

I claim:

1. A rate of penetration indicator comprising, in combination, a solenoid, a clock having a stylus carrying arm arranged to be returned to an initial position and resume operation upon action of the solenoid, a chart arranged to receive a record produced by said stylus, a member arranged for rotative motion upon linear movement of a cable in contact therewith, a shaft carried by said member, a pair of electrically connected autosynchronous motors, a mechanical connection between one of said motors and said shaft, a mechanical linkage connecting the other of said motors with a drum arranged to move said chart, and a distributor arranged to be operated by said last mentioned motor and electrically connected with said solenoid to break said circuit upon a predetermined amount of rotation of said shaft.

2. A rate of penetration recorder comprising, in combination, a chart, a motor arranged for advancing said chart, a clock mechanism provided with a hand, a marking means attached to said hand arranged to produce a record on said chart, a solenoid arranged to return said marking means to an initial position electrically connected in a circuit including a distributor mechanically linked to said motor, and means arranged for rotating said motor an amount directly proportional to the downward movement of the drill bit while drilling.

3. A rate of penetration meter comprising, in combination, a chart, a shaft carrying said chart, a clock mechanism, a hand for said clock, a marking means carried by said hand, arranged to produce a record on said chart, a solenoid for returning said arm to an initial position, an electrical circuit including said solenoid, a source of direct current and a distributor, a means arranged for advancing said chart carrying shaft and for completing said circuit through said distributor upon movement of said chart a predetermined distance, and means for rotating said shaft an amount proportional to the penetration of a drill bit comprising a pair of electrically connected auto-synchronous units, mechanical linkage between one of said units and said shaft, and a mechanical linkage between the other of said units and a cable supporting the bit carrying drill stem.

4. A device for recording the rate of linear motion of an object comprising, in combination, a chart, a chart advancing means arranged for advancing said chart amounts directly proportional to the amounts of linear motion of the object, a clock mechanism, a marking means activated by said clock to produce a record on said chart, a distributor mechanically linked to said chart advancing means, and a solenoid arranged to return said marking means to an initial position, electrically connected in a circuit including said distributor.

SAMUEL T. SIKES, Jr.